United States Patent
Bronshtein et al.

(10) Patent No.: US 8,882,966 B2
(45) Date of Patent: Nov. 11, 2014

(54) PYROLYTIC REACTOR

(75) Inventors: Alexander P. Bronshtein, Beer Sheva (IL); Menachem L. Skop, Beer Sheva (IL); Moshe Weiss, Tel Aviv (IL); David Shalom Jakobowitch, Bnei Brak (IL)

(73) Assignee: T.D.E. Recovery Technologies Ltd., Beer Sheva (IL)

( * ) Notice: Subject to any disclaimer, the term of this patent is extended or adjusted under 35 U.S.C. 154(b) by 656 days.

(21) Appl. No.: 13/256,996

(22) PCT Filed: Mar. 16, 2010

(86) PCT No.: PCT/IL2010/000217
§ 371 (c)(1),
(2), (4) Date: Sep. 16, 2011

(87) PCT Pub. No.: WO2010/106538
PCT Pub. Date: Sep. 23, 2010

(65) Prior Publication Data
US 2012/0006669 A1    Jan. 12, 2012

Related U.S. Application Data

(60) Provisional application No. 61/160,842, filed on Mar. 17, 2009.

(51) Int. Cl.
*C10B 7/10* (2006.01)
*C10J 3/66* (2006.01)
(Continued)

(52) U.S. Cl.
CPC ... *F27B 7/00* (2013.01); *C10J 3/66* (2013.01); *F27B 7/362* (2013.01); *C10B 1/10* (2013.01); *B65G 11/206* (2013.01); *C10B 49/04* (2013.01); *F23G 5/0276* (2013.01);
(Continued)

(58) Field of Classification Search
CPC ............ C10B 1/08; C10B 1/10; C10B 31/04; C10B 55/00; C10G 1/10
USPC ................. 202/117, 118, 131, 136, 268, 135; 432/251; 201/7, 2.5
See application file for complete search history.

(56) References Cited

U.S. PATENT DOCUMENTS 4,098,649 A * 7/1978 Redker .......................... 201/2.5
4,240,587 A    12/1980 Letsch
(Continued)

FOREIGN PATENT DOCUMENTS

DE    19520564    2/1997
FR    2350136    12/1977
(Continued)

OTHER PUBLICATIONS

International Preliminary Examination Report for parent PCT Application Serial No. PCT/IL2010/000217, completed May 3, 2011.

*Primary Examiner* — Nina Bhat
(74) *Attorney, Agent, or Firm* — Roach Brown McCarthy & Gruber, P.C.; Kevin D. McCarthy

(57) ABSTRACT

A pyrolytic reactor, comprising an inner drum having a circumferential wall formed with a plurality of apertures, an outer drum surrounding the inner drum and defining a clearance therebetween, a feeding device for feeding a plurality of feedstock pieces to the interior of the inner drum, an inlet port through which heat carrier gases flow and are directed to said clearance, for introduction of the heat carrier gases via said plurality of apertures to the inner drum interior and causing pyrolysis of the fed feedstock pieces, a conveyor for transporting a plurality of solid residue pieces produced from a pyrolytic process, and an outlet port through which product vapors and gases, heat depleted heat carrier gases, and the plurality of solid residue pieces are discharged.

26 Claims, 13 Drawing Sheets

(51) Int. Cl.
*F27B 7/36* (2006.01)
*C10B 1/10* (2006.01)
*B65G 11/20* (2006.01)
*C10B 49/04* (2006.01)
*F23G 5/027* (2006.01)
*C10B 53/07* (2006.01)
*C10B 51/00* (2006.01)
*F27B 7/20* (2006.01)
*F27B 7/00* (2006.01)
*F27D 3/16* (2006.01)
*F27B 7/10* (2006.01)
*F23G 5/20* (2006.01)
*F27B 7/42* (2006.01)

(52) U.S. Cl.
CPC ............... *C10B 53/07* (2013.01); *C10B 51/00* (2013.01); *F27B 7/20* (2013.01); *C10J 2300/0973* (2013.01); *F27D 3/16* (2013.01); *C10J 2300/094* (2013.01); *F27B 7/10* (2013.01); *C10J 2300/0956* (2013.01); *F23G 5/20* (2013.01); *F27B 7/42* (2013.01); *C10J 2300/0946* (2013.01)

USPC ........... 202/117; 202/118; 202/131; 202/135; 202/136; 202/268

(56) References Cited

U.S. PATENT DOCUMENTS

| | | | | |
|---|---|---|---|---|
| 4,781,796 | A * | 11/1988 | Bridle et al. | 202/117 |
| 4,872,954 | A * | 10/1989 | Hogan | 202/105 |
| 4,908,104 | A * | 3/1990 | Loomans et al. | 201/25 |
| 5,078,836 | A * | 1/1992 | Hogan | 201/7 |
| 5,082,534 | A * | 1/1992 | Breu | 202/131 |
| 5,095,040 | A * | 3/1992 | Ledford | 521/40.5 |
| 5,212,144 | A | 5/1993 | Schwartz | |
| 5,225,044 | A | 7/1993 | Breu | |
| 5,258,101 | A * | 11/1993 | Breu | 202/131 |
| 6,221,329 | B1 * | 4/2001 | Faulkner et al. | 423/445 R |
| 8,419,901 | B2 * | 4/2013 | Flottvik | 201/25 |
| 2007/0113761 | A1 | 5/2007 | Cole et al. | |

FOREIGN PATENT DOCUMENTS

| | | |
|---|---|---|
| WO | 2010106539 A1 | 9/2010 |
| WO | 2010106540 A1 | 9/2010 |

* cited by examiner

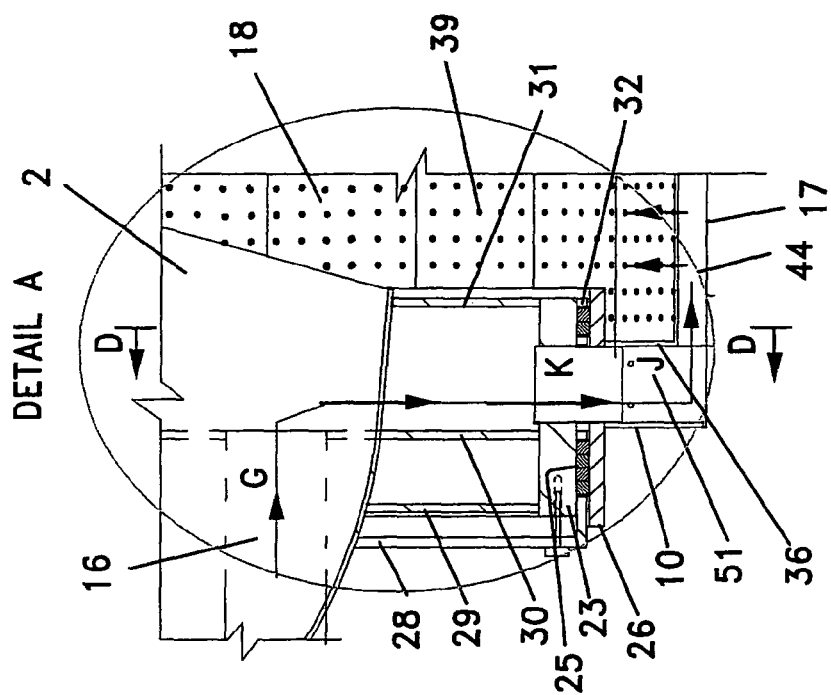
Fig. 7B
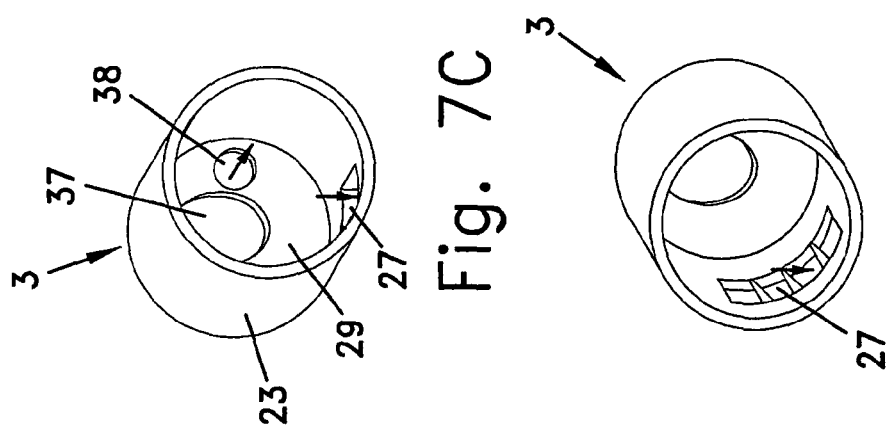
Fig. 7C
Fig. 7D
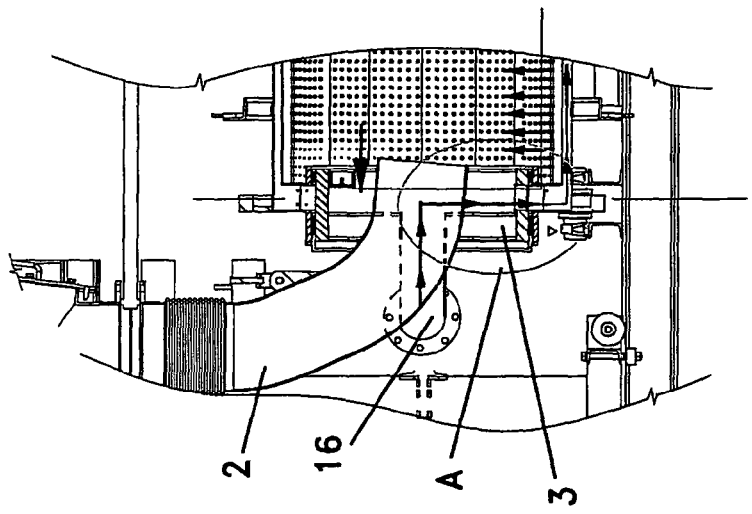
Fig. 7A

PYROLYTIC REACTOR

FIELD OF THE INVENTION

The present invention relates to a pyrolytic reactor for processing organic based raw materials, e.g. discarded tires, resulting in gaseous and liquid products which are usable for example to generate electrical power. More particularly, the reactor is designed such that the heat transfer between heat carrier gases and the raw material is sufficiently intensive so that a good pyrolytic performance can be achieved with respect to relatively large feedstock pieces that are fed to the reactor, to obviate the high preprocessing costs associated with prior art reactors.

BACKGROUND OF THE INVENTION

At present, the recovery of discarded tires remains a serious problem, despite certain achievements in this field. Some discarded tires are utilized in civil engineering and in road construction, as well as in the manufacturing of different goods. Nevertheless about 30% of discarded tires, and in some countries, up to 80%, are still disposed in stockpiles. A large number of tires are located outside of the stockpiles, and pollute the environment. On the other hand the non-utilized discarded tires may present a valuable raw material being a source of chemical energy due to the organic and carbonized components contained in this material.

Most of the known methods for converting the rubber containing materials of tires into useful products are based on pyrolysis. A pyrolysis process generally operates at temperatures of about 500° C. in a low oxygen atmosphere and results in producing hydrogen-hydrocarbon gas, a liquid hydrocarbon product, and a solid material. The solid material comprises a carbonized part and the steel cord of the tire.

Many prior art reactors convert the rubber containing materials of tires into the aforementioned products by heat induced decomposition, but are impractical due to the resulting environmental pollution or due to cost ineffectiveness.

U.S. Pat. No. 4,240,587 discloses a vehicular processing plant for processing scrap tires and similar materials. The technical rubber is initially processed through a cryogenic crushing and separation section during which a considerable amount of reusable technical rubber is mechanically separated, and thereafter the remainder is pyrolytically treated so that reusable commercial byproducts are obtained while high-energy containing gases and oils are utilized in operation of the plant. This pyrolytic reactor is not economically viable as small scrap tire particles are fed thereto, resulting in high pre-processing costs.

U.S. Pat. No. 5,095,040 discloses a process for converting scrap tires into oil and carbon by shredding the tires to rubber crumb particles smaller than ¾ inch in size, charging the rubber crumb particles into an inclined heated rotating tube and maintained at a slight pressure above atmospheric pressure so as to minimize air infiltration into the tube, rapidly heating the rubber crumb particles to a temperature at which they decompose into a gaseous product and a solid residue, condensing a portion of the gaseous product, and recovering a liquid condensate from the condensed gaseous product. This process is also not cost effective due to the high pre-processing costs involved in shredding the tires to small pieces.

U.S. Pat. No. 5,225,044 discloses a rotary continuous pyrolytic conversion system for solid hydrocarbon based comminuted feedstock pieces. An oven chamber defined by a casing around an outer air-tight stationary drum in which is contained a rotatable converter drum heated by combustion products from a burner. Fins extending into the oven chamber from the stationary outer drum induce turbulence of the combustion products, increasing heat transfer from the combustion products to the outer drum, and thence to the converter chamber. A rod extends into the injection end of the converter drum for supporting scrapers against the inner periphery of the converter drum. A crusher bar is carried in the drum at the discharge end thereof and crushes the solid products which consist of char, metals and other non-organic materials. A chute containing water receives the pulverized discharge product and balances the pressure in the converter to maintain an air-tight seal therein. A second pyrolytic reactor may receive the solid pyrolysis products and be operative at a higher temperature than the first converter to destroy chlorinated hydrocarbons. In addition to the relatively high costs involved in comminuting the feedstock pieces, an additional disadvantage of this system is that the combustion products flow across the exterior of the outer drum and indirectly transfer heat to the converter drum only by convection, while the wall of the converter drum transfers heat to the feedstock pieces only by conduction.

It is an object of the present invention to increase the intensity of heat transfer to the feedstock pieces introduced to a reactor and to thereby increase the rate of pyrolysis by introducing heat carrier gases into a selected region of the reactor interior.

It is an additional object of the present invention to provide a pyrolytic reactor suitable for pyrolyzing relatively large feedstock pieces having a size greater than approximately 200 mm, thereby significantly reducing the pre-processing costs associated with prior art reactors.

It is an additional object of the present invention to provide a pyrolytic reactor for generating gas, and preferably liquid, products that are usable in industrial processes such as electrical energy generation.

It is an additional object of the present invention to provide a pyrolytic reactor that prevents, during the course of operation, products of pyrolysis from escaping therefrom to the atmosphere and to thereby prevent environmental pollution.

It is yet additional object of the present invention to provide a pyrolytic reactor that facilitates removal of the solid residue of a pyrolysis process without having to cease operation of the reactor.

SUMMARY OF THE INVENTION

The pyrolytic reactor of the present invention comprises an inner drum having a circumferential wall formed with a plurality of apertures; an outer drum surrounding said inner drum and defining a clearance therebetween; a feeding device for feeding a plurality of feedstock pieces to the interior of said inner drum; an inlet port through which heat carrier gases flow and are directed to said clearance, for introduction of said heat carrier gases via said plurality of apertures to the inner drum interior and causing pyrolysis of said fed feedstock pieces; conveying means for transporting a plurality of solid residue pieces produced from a pyrolytic process; and an outlet port through which product vapors and gases, heat depleted heat carrier gases, and the plurality of solid residue pieces are discharged.

The heat carrier gases are driven to the inner drum interior by the pressure differential between the heat carrier gases and the inner drum interior, and are directable to a selected region of the inner drum interior. By being able to introduce the heat carrier gases via said plurality of apertures to the selected region of the inner drum interior, the heat carrier gases directly transfer heat to the feedstock pieces by means of a cross flow and intimate contact at a significantly increased intensity relative to prior art reactors. Thus relatively large feedstock pieces on the order of 200 mm or larger are pyrolyzed at substantially the same time for pyrolyzing small feedstock pieces on the order of 20 mm or less in a prior art reactor, while achieving a good pyrolytic performance such that the size ratio of a removed solid residue piece to a fed feedstock piece is less than 10%.

In a preferred embodiment, the inlet port comprises a flow director unit configured with a circumferential wall formed with one or more openings in communication with the clearance; a planar wall at the inlet end of said flow director unit circumferential wall; a first aperture bored in said inlet end wall through which a feedstock piece feed tube passes into the interior of the inner drum; a second aperture bored in said inlet end wall through which a heat carrier gas tube passes; and a planar wall at the discharge end of said flow director unit circumferential wall through which said feed tube passes into the interior of the inner drum, for directing the heat carrier gases to said one or more openings and for causing longitudinal flow of the heat carrier gases through the clearance.

In a preferred embodiment, the outer drum and the inner drum are connected together, such as by means of a plurality of circumferentially spaced plates that radially extend therebetween, and are rotatable about a common axis by drive means. While only the inner drum rotates and the outer drum is stationary in many prior art pyrolytic reactors, requiring the entire inner drum diameter to be sealed, the size of the sealing means of the reactor of the preset invention is significantly reduced with respect to that of the prior art since the outer and outer drums rotate in unison. The sealing means adapted to prevent the egress of heat carrier gases interfaces with each of the stationary flow director unit and stationary outlet port and a corresponding rotating part, the size of which is significantly less than the inner drum diameter.

In one aspect, the longitudinal flow of the heat carrier gases is limited through a circumferential zone of the clearance by means of a plurality of circumferentially spaced and radially extending barrier members that protrude from the inner surface of the outer drum. The outer drum slightly longitudinally protrudes from the inner drum and each of the plurality of barrier members radially extends from the inner surface of the outer drum to substantially contact the flow director unit circumferential wall.

In one aspect, each of the plurality of barrier members comprises a proximal rigid element and a distal flexible element for sealingly and rotatably contacting the flow director unit circumferential wall. The radial length of each barrier member is slightly greater than the gap from the inner surface of outer drum to the flow director unit circumferential wall.

In one aspect, the distal element is a panel of heat insulation material that is resistant to the temperature of the heat carrier gases.

In one aspect, the heat carrier gases are directed to a circumferential portion of the inner drum interior having an angular distance substantially equal to that of the one or more openings formed in the flow director unit circumferential wall.

In one aspect, the inner drum is inclined such that an inlet end thereof is disposed above a discharge end thereof, the feedstock pieces being conveyed from a first inner drum bottom region to a second inner drum bottom region closer to the discharge end than said first inner drum bottom region following upward rotation of the inner drum and a subsequent descent of the feedstock pieces upon conclusion of their angular displacement.

In one aspect, a plurality of circumferentially spaced partitions radially extend from the inner drum surface and longitudinally extend between the inlet end to the discharge end of the inner drum, the feedstock pieces being retained in a compartment defined by two adjacent partitions and the inner drum surface throughout a predetermined angular displacement during rotation of the inner drum. A partition supports a plurality of feedstock pieces from below when they are being upwardly rotated.

In one aspect, the pressure of the heat carrier gases within the clearance between the outer and inner drums is selected to be sufficiently high to pyrolyze the feedstock pieces, prior to being dissipated, only within a predetermined radial zone from the inner surface of inner drum corresponding to the radial location of the feedstock pieces when they are being upwardly rotated, to optimize the utilization of the heat carrier gases.

The temperature of the heat carrier gases, which are preferably generated in a gas generator, is sufficiently high for initiating pyrolysis of the feedstock pieces, generally between 650-700° C. The heat carrier gases may comprise carbon monoxide, hydrogen, and nitrogen, which are not reactable with the product gases, including hydrocarbons such as methane, butane, butylenes and their hydrogen isomers, and hydrogen sulfide. When the heat carrier gases are generated by the gasification of the solid residue pieces, which consist primarily of solid carbon, the other reactants of the gasification process may comprise one or more of oxygen, air, and steam.

In one aspect, a plurality of equally and circumferentially spaced dispensing elements inwardly protrude from the inner surface of the inner drum at the discharge end thereof, for sequentially raising the solid residue pieces and dispensing the same into an exit tube during rotation of the inner drum. The solid residue pieces are gravitationally dispensed via the exit tube into a transportable bin.

In one aspect, each of the dispensing elements is planar and has a distal end that is offset from an inner drum radius in the direction of rotation, a solid residue piece being supported by both an exterior facing side of a corresponding dispensing element and the inner drum surface while being angularly displaced until sliding from the dispensing element into the exit tube.

In one aspect, the reactor further comprises means for controlling the longitudinal flow rate of the heat carrier gases through the clearance.

In one aspect, the flow rate controlling means is a baffle plate attached to the inner surface of the outer drum and occupying a selected portion of the clearance.

In one aspect, the baffle plate angularly extends between two adjacent barrier members from the inlet end to the discharge end, to induce a correspondingly slower flow rate of heat carrier gases at the inlet side than at the discharge side.

In one aspect, the longitudinal flow rate of the heat carrier gases is controlled by means of a selected density of apertures in the inner drum circumferential wall.

In one aspect, the feedstock pieces are continuously pyrolyzable even when the solid residue pieces are dispensed into the exit tube. A knife valve may occlude the exit tube prior to transporting the bin to a location whereat the solid residue pieces are discharged therefrom.

In one aspect, the feedstock pieces are continuously pyrolyzable even when other feedstock pieces are being fed into the inner drum interior.

In one aspect, an evacuation exhauster discharges product vapors and gases and heat depleted heat carrier gases from the inner drum interior.

In one aspect, the reactor further comprises isolating means for isolating the product vapors and gases from the feeding device, thereby preventing environmental pollution upon charging the feeding system.

In one aspect, the isolating means comprises means for purging the interior of the feeding system drum from the product gases by means of a gas not reactable with the feedstock pieces and which is deliverable to the inner drum.

In one aspect, the isolating means comprises a knife valve operatively connected to a feed tube through which the feedstock pieces are delivered from the feeding device.

BRIEF DESCRIPTION OF THE DRAWINGS

In the drawings:

FIG. 7A is a partial longitudinal cut-off view of the reactor of FIG. 2, schematically illustrating the flow of heat carrier gases through an annular clearance into the interior of the inner drum;

FIG. 7B is an enlargement of Detail A of FIG. 7A;

FIGS. 7C-D are two perspective views, respectively, of the cylindrical wall of the flow director unit of FIG. 5B;

DETAILED DESCRIPTION OF PREFERRED EMBODIMENTS

The present invention is a novel pyrolytic reactor that is configured with means for introducing heat carrier gases into a selected region of the reactor interior. The heat carrier gases are directed to a region of the reactor interior at which organic feedstock pieces introduced therein are located, thereby increasing the intensity of heat transfer between heat carrier gases and the feedstock pieces so that relatively large feedstock pieces, for example having a size of 200 mm or greater, can be fed to the reactor and be suitably pyrolyzed. Thus the high preprocessing costs for producing small feedstock pieces such as by comminution or by crushing, i.e. sized generally less than 20 mm, associated with prior art reactors that can suitably pyrolyze only small feedstock pieces are obviated.

Figure 1:
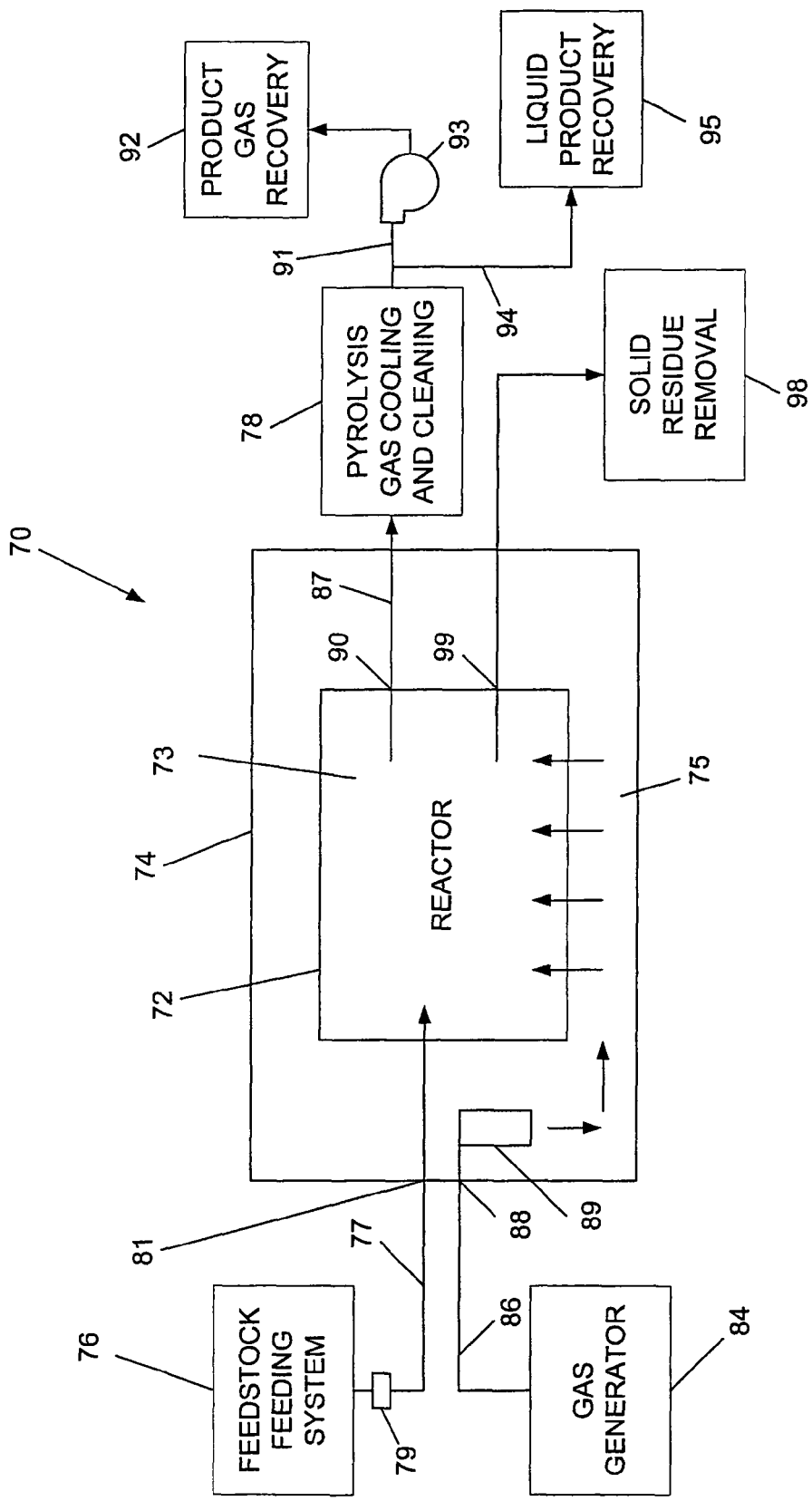
FIG. 1 is a block diagram of a pyrolytic reactor according to one embodiment of the present invention.

Reference is now made to FIG. 1, which schematically illustrates a pyrolytic reactor 70 according to one embodiment of the present invention. Reactor 70 comprises inner drum 72 and outer drum 74 surrounding the inner drum and defining clearance 75, e.g. an annular clearance, therebetween. Feedstock feeding system 76 feeds feedstock pieces into interior 73 of inner drum 72 via conduit 77 that passes through sealed inlet 81 of the inner drum. Heat carrier gases are generated for transferring heat to the feedstock pieces in order to initiate the pyrolytic process. The product vapors and gases that are generated by reactor 70 during the pyrolytic process, as well as the heat depleted heat carrier gases, are discharged through sealed outlet 90 from inner drum 72 via conduits 87 and 91 by means of evacuation exhauster 93 at a pressure below inner drum interior 73 and are delivered to product gas recovery system 92 after being subjected to the cooling and cleaning unit 78 for pyrolysis vapors and gas. Depending on the type of feedstock pieces introduced to the reactor, a liquid product may be condensed from the product gas and delivered via conduit 94 branching from conduit 91 to recovery system 95. Reactor 70 is also provided with a solid residue removal system 98 to remove the solid residue through sealed outlet 99 that may remain at the conclusion of the pyrolytic process. When inner drum 72 and outer drum 74 are stationary, removal system 98 includes suitable conveyance means disposed within interior 73 and well known to those skilled in the art, e.g. a moving surface such as a conveyor belt system resistant to the high temperature of the heat carrier gases, to remove and handle the solid residue. When inner drum 72 and outer drum 74 rotate, removal system 98 may include a plurality of longitudinally extending partitions for confining and advancing each feedstock piece and a plurality of dispensing elements, as will be described hereinafter.

The heat carrier gases are introduced to reactor 73 at a sufficiently high temperature for initiating pyrolysis of the feedstock pieces, generally between 650-700° C. The heat carrier gases may be generated by a gas generator 84 by any method well known to those skilled in the art. Alternatively, the heat carrier gases in gas generator 84 may be generated by the gasification of the solid product of pyrolysis which is solid carbonized residue, or may be the gaseous products of pyrolysis which were purified from hydrogen sulfide and heated, as described in the copending international patent application 13/256,990 and entitled "ENVIRONMENTALLY CLEAN PROCESS FOR UTILIZING PYROLYSIS PRODUCTS", the contents of which are incorporated herein by reference.

The circumferential wall of inner drum 72 is advantageously formed with a plurality of apertures, to allow the heat carrier gases, which are delivered through conduit 86 and introduced into clearance 75 via sealed outer drum inlet 88, to pass through the apertures and to transfer heat to the feedstock pieces. While the inner drum of prior art reactors has a continuous and unapertured circumferential wall along which heat carrier gases flow to transfer heat indirectly to the introduced feedstock pieces via the inner drum circumferential wall, by virtue of the apertured inner drum 72 of the present invention, the heat carrier gases are delivered to the inner drum interior 73 and are able to be in intimate contact with the feedstock pieces.

Thus the cross flow of the heat carrier gases directly transfers heat to each of the feedstock pieces by conduction and also by small surface area convection, thereby dramatically increasing the intensity of heat transfer to the feedstock pieces fed to the reactor of the present invention relative to those fed to prior art reactors. Since heat is transferred by means of reactor 70 at a high rate to the feedstock pieces, the feedstock pieces that are fed to inner drum 72 may be larger than those fed to prior art reactors while being pyrolyzed at substantially the same time as small feedstock pieces that are pyrolyzed in a prior art reactor. Thus reactor 70 of the present invention will achieve a good pyrolytic performance with respect to relatively large feedstock pieces, e.g. on the order of 200 mm or larger, so that the size ratio of a solid residue piece removed from the reactor upon conclusion of the pyrolytic process to a fed feedstock piece may be for example less than 10%.

Conduit 86 through which the heat carrier gases flow may be in communication with a flow director unit 89. The heat carrier gases passing through unit 89 are urged thereby to flow in a specific region of clearance 75, e.g. in communication with the bottom of inner drum 72 as shown, in order to maximize their utilization so that they will be in heat exchange relation with the feedstock pieces being disposed in the vicinity of the inner drum bottom and not have to be introduced to other regions of the inner drum interior 73.

Figure 2:
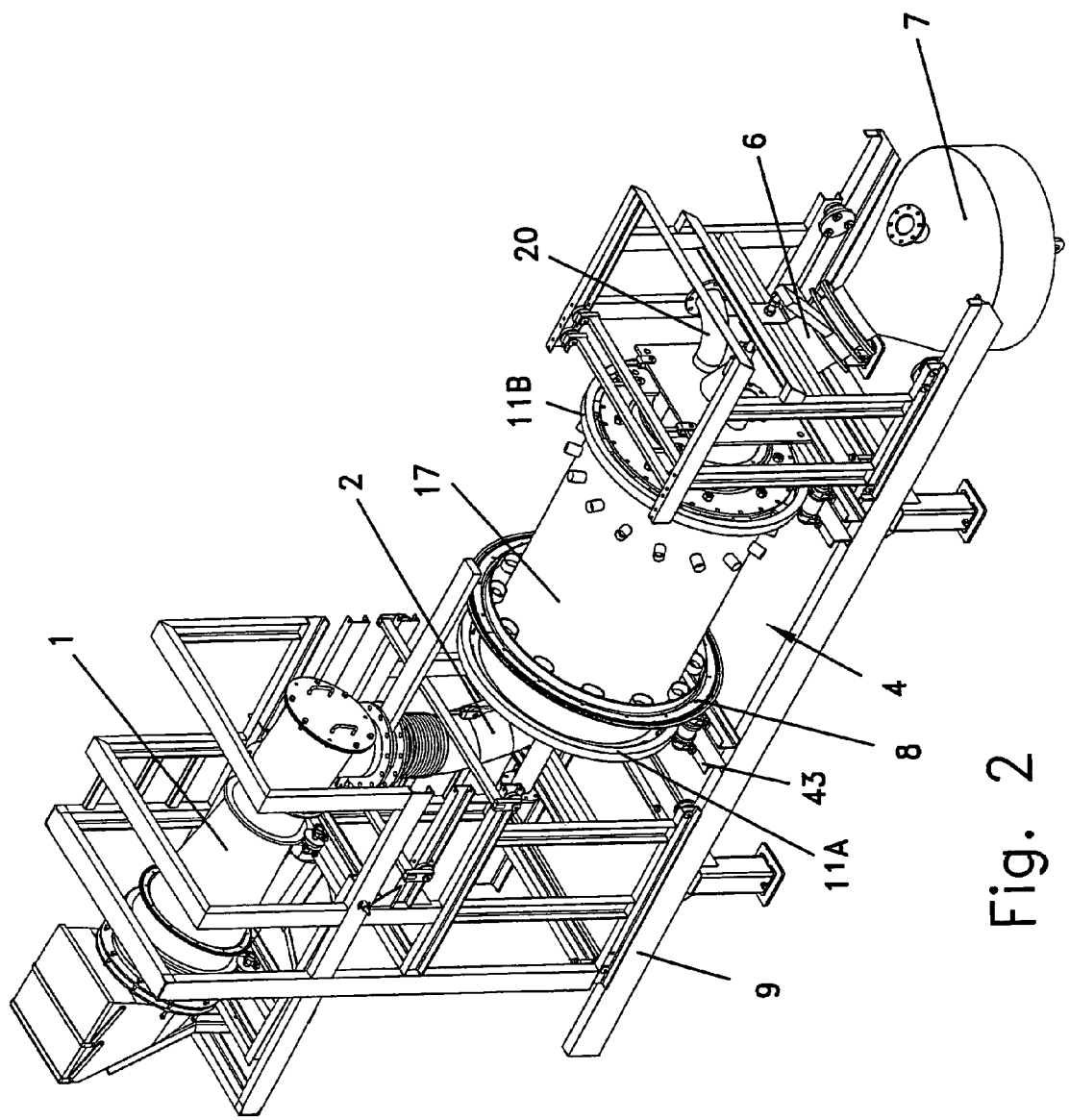
FIG. 2 is a perspective view of a pyrolytic reactor and associated apparatus according to one embodiment of the present invention.
Figure 3:
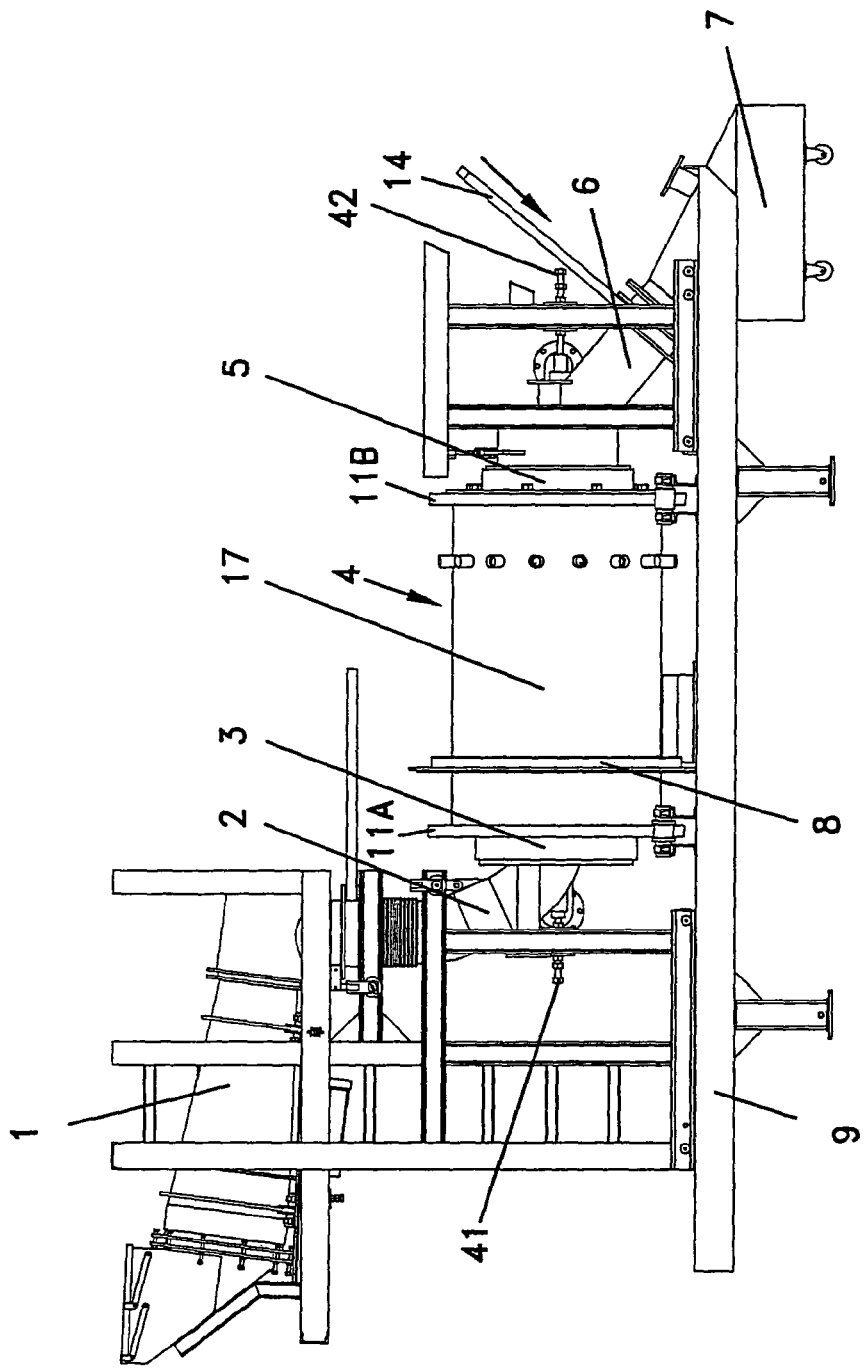
FIG. 3 is a side view of the pyrolytic reactor of FIG. 2.

FIGS. 2 and 3 illustrate perspective and side views, respectively, of a rotatable pyrolytic reactor generally designated by numeral 4, according to one embodiment of the present invention. Feedstock pieces are delivered by feeding system 1 via feed tube 2, which passes through stationary flow director unit 3 serving as the inlet port, to reactor 4. Heat carrier gases are also delivered to the reactor via flow director unit 3. The products of pyrolysis are discharged from the reactor at stationary output port 5, the gas and vapors flowing through exit pipe 20 to recovery systems 92 and 95 (FIG. 1), respectively, and the solid residue being discharged through exit tube 6 is transferred to transportable bin 7. The flow of the solid residue being discharged from the reactor may be temporarily discontinued by means of knife valve 14, for example when bin 7 is replaced.

Feeding system 1 may be any feeding system well known to those skilled in the art for feeding feedstock pieces to a pyrolytic reactor. Alternatively, feeding system may be the apparatus described in the copending international patent application 13/257,000 and entitled "FEEDING APPARATUS AND METHOD FOR A PYROLYSIS REACTOR", comprising a rotatable drum to which feedstock pieces are introduced, for applying forces of sufficient magnitude and varying direction to an aggregated mass of feedstock pieces such that constituent feedstock pieces are separated from the aggregated mass and are discharged from the drum via feed tube means to the pyrolytic reactor, the contents of which are incorporated herein by reference.

As described in said copending international patent application, isolating means 79 (FIG. 1) may be provided, to isolate noxious gaseous products of pyrolysis from the feeding system when the latter is recharged and to thereby prevent environmental pollution. Isolating means 79 may comprise a source for purging the gaseous products of pyrolysis from the interior of the feeding system drum by means of gas not reactable with the feedstock pieces such as carbon dioxide, which is delivered through feeding system 1 to reactor 4. Alternatively, or in addition, isolating means 79 may be a knife valve operatively connected to feed tube 2.

Reactor 4 comprises an outer drum 17 and an inner drum 18 (FIGS. 5A and 7B) that are connected together by a plurality of circumferentially spaced plates 21 (FIGS. 6B and 8) radially extending therebetween. Outer drum 17 and inner drum 18, which may be concentric tubular drums, rotate about a common axis (not shown). Outer drum 17 slightly longitudinally protrudes from inner drum 18. Anchor elements 41 and 42 resist longitudinal expansion of the reactor.

Figure 4B:
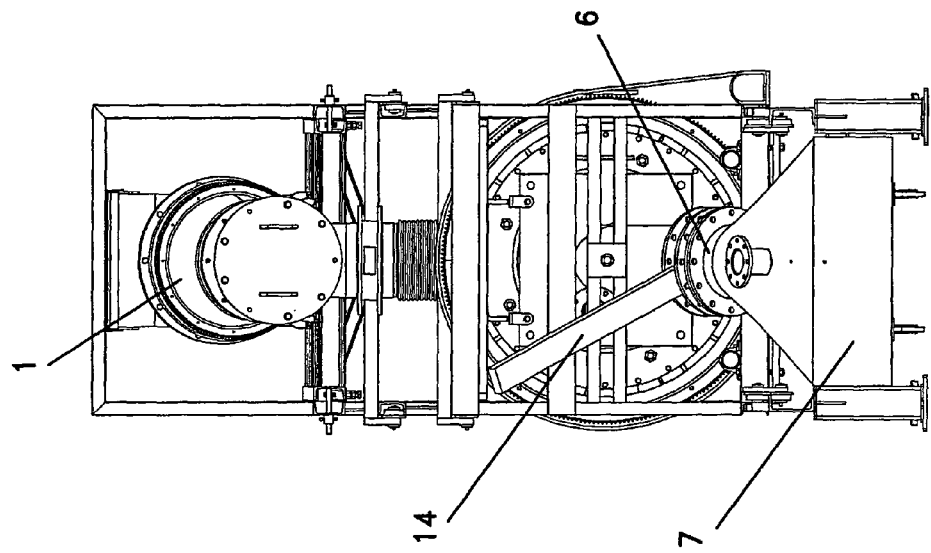
FIGS. 4A and 4B are front and rear views, respectively, of the pyrolytic reactor of FIG. 3.
Figure 4A:
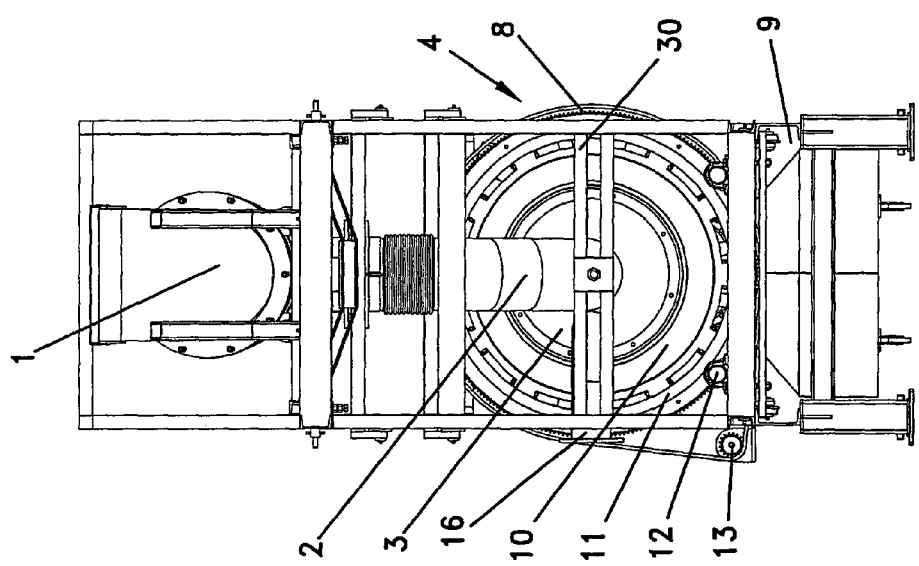
Figure 12:
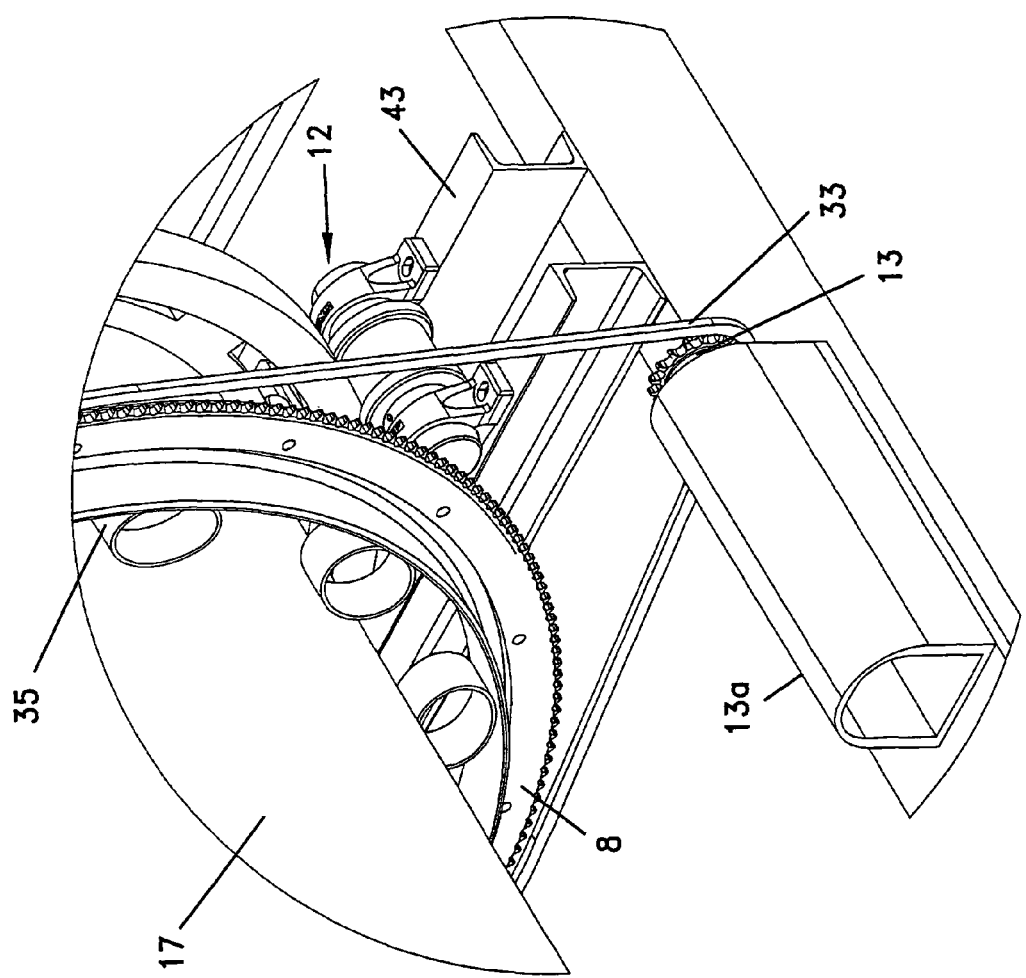
FIG. 12 is a perspective view of a portion of the driving means for rotating the reactor of FIG. 2.

With reference to FIGS. 2, 4A, and 12, rings 11A-B are fixedly attached to, or integral with, the inlet and discharge ends, respectively of outer drum 17. Each of rings 11A-B is supported by a pair of spaced rollers 12 mounted to a base, e.g. a corresponding pair of crossbeams 43 vertically protruding from longitudinally extending support beams 9 to align feed tube 2 with flow director unit 3. A gear wheel 8, to an inner surface of which are attached a plurality of circumferentially spaced cylinders 35 arranged such that their axis is substantially parallel to the axis of outer drum 17 to compensate for thermal deformation of the reactor during the pyrolytic process, is also fixedly attached to, e.g. by welding, to outer drum 17 so that gear wheel 8, rings 11A-B and outer drum 17 are concentric. As chain 33 in engagement with the teeth of gear wheel 8 and of the output gear 13 of the motor housed in casing 13a is driven by the motor, drums 17 and 18 rotate, e.g. at a predetermined or controlled speed.

FIG. 4A illustrates a front view of the pyrolysis apparatus. The inlet end of the outer drum is covered by annular end plate 10 in sealing and rotatable contact with flow director unit 3. To flow director unit 3 are delivered heat carrier gases via tube 16, e.g. extending perpendicularly to the longitudinal axis of the reactor and curving at the inlet of flow director unit 3 to be substantially parallel to the reactor longitudinal axis as shown in FIGS. 5C and 6A, and feedstock pieces via feed tube 2, which passes through flow director unit 3 into the interior of the inner drum. The pyrolysis apparatus, including feeding system 1 and reactor 4, is supported by framework 30 comprising a plurality of U-beams and beams 9 therebelow.

FIG. 4B is a rear view of the pyrolysis apparatus. The discharge end of the outer drum is covered by a plate in sealing and rotatable contact with the stationary output port.

Figure 5A:
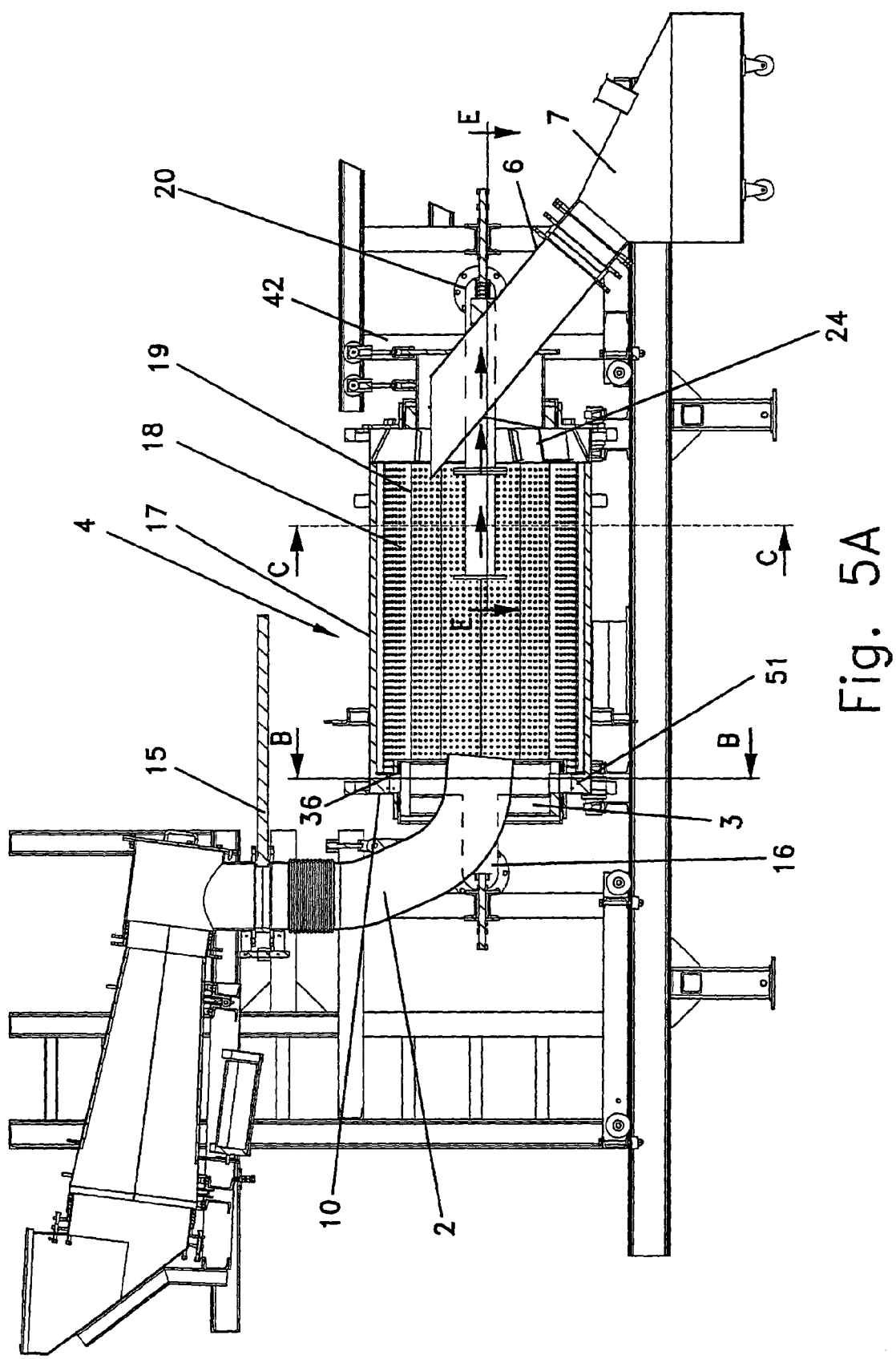
FIG. 5A is a longitudinal cut-off view of the reactor of FIG. 2.
Figure 5C:
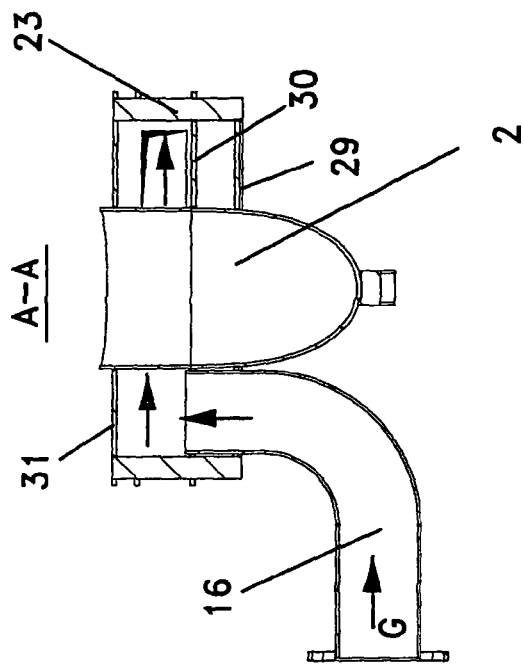
FIG. 5C is a cross sectional view of a flow director unit, cut along plane A-A of FIG. 5B.
Figure 5B:
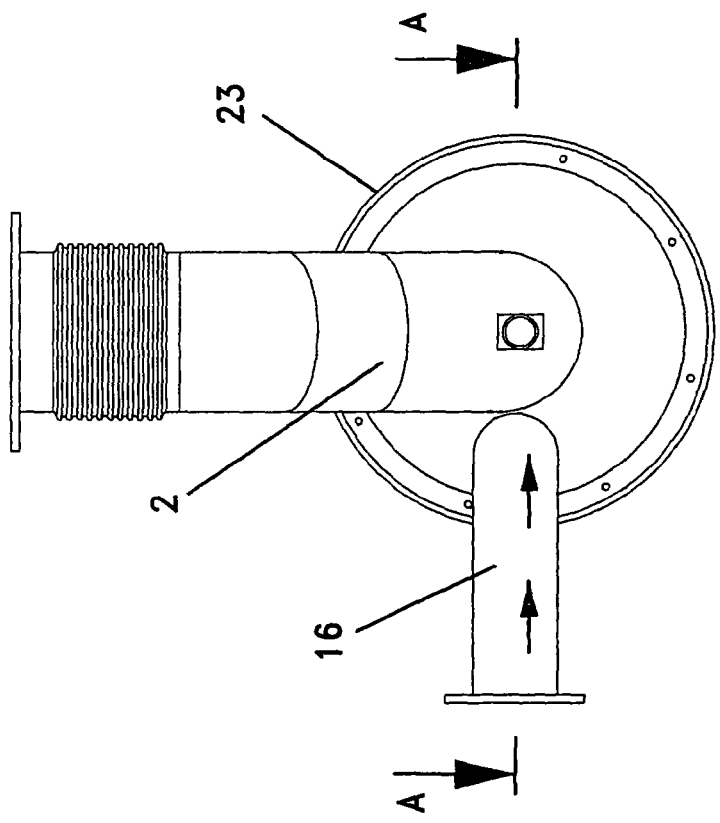
FIG. 5B is a front view of a flow director unit shown in FIG. 4A and of the feedstock and heat carrier gas feed tubes attached thereto.

A longitudinal cut-off view of reactor 4 is shown in FIG. 5A, i.e. a portion of the reactor is peeled away to show the apertured inner drum. The circumferential wall of inner drum 18 is perforated, to allow for the passage of the heat carrier gases at a temperature of approximately 650° C. through the apertures to the inner drum interior so that the feedstock pieces will be sufficiently heated, e.g. a temperature approximately equal to, or greater than, 500° C., to undergo a pyrolytic process.

The following description is related to the movement of relatively large sized tire pieces within the inner drum interior. The manner of movement may be different when the feedstock pieces are of other types.

Outer drum 17 and inner drum 18 may be slightly inclined at an angle, e.g. ranging from 0.5-3 degrees, such that the inlet end is above the discharge end. Accordingly, feedstock pieces introduced into the inner drum interior via feed tube 2 will be conveyed gravitationally to the discharge end of the inner drum. In addition to being conveyed gravitationally, the feedstock pieces are also conveyed by means of the rotation of inner drum 18. That is, the feedstock pieces remain in contact with the inner surface of the inner drum throughout an angular distance from the inner drum bottom to an ending angle corresponding to a height at which they fall, depending upon the speed of the inner drum, the coefficient of friction of the feedstock pieces, and the number of feedstock piece layers being supported by longitudinal partitions (FIGS. 5A, 11A and 11B), if partitions are employed. The feedstock pieces being pyrolyzed and located at a downstream portion of the inner drum continue the cycle of rotating and falling until they are displaced to the discharge end. The rate of advancement of the feedstock pieces toward the discharge end is dependent upon the angular speed and inclination of inner drum 18. By virtue of the falling of the feedstock pieces within the inner drum interior and the subsequent mixing of those feedstock pieces that fell with other feedstock pieces, the intensity of heat transfer from the heat carrier gases to the feedstock pieces increases. Also, the cyclical upward rotation, falling, and advancement toward the discharge end of the feedstock pieces helps to prevent aggregation of adjacent feedstock pieces, which would reduce the available feedstock piece surface area that is exposable to the heat carrier gases.

Figure 6B:
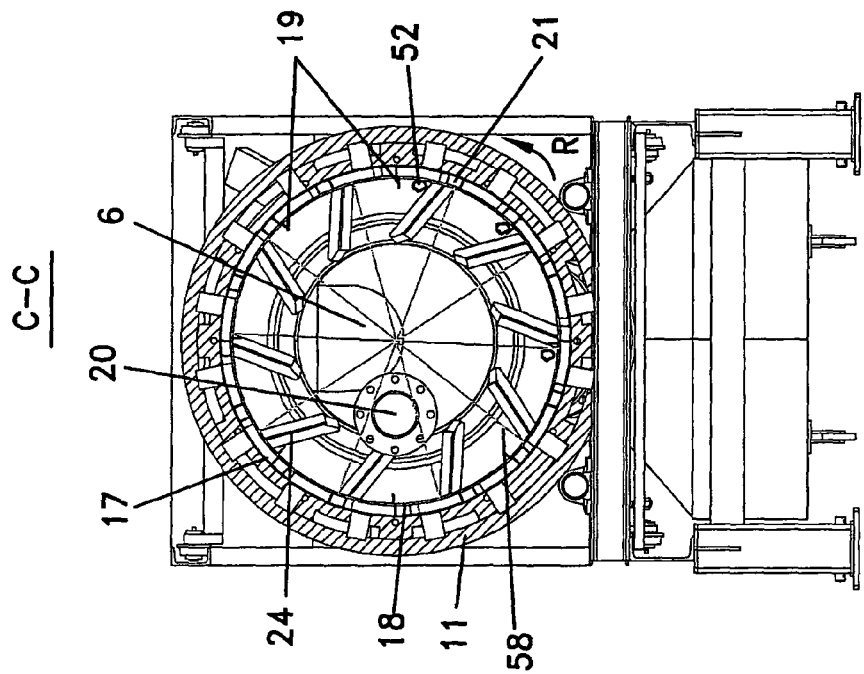
FIG. 6B is a cross sectional view of the reactor cut along plane C-C of FIG. 5B, showing a plurality of elements for dispensing solid residue pieces to an exit tube.
Figure 6A:
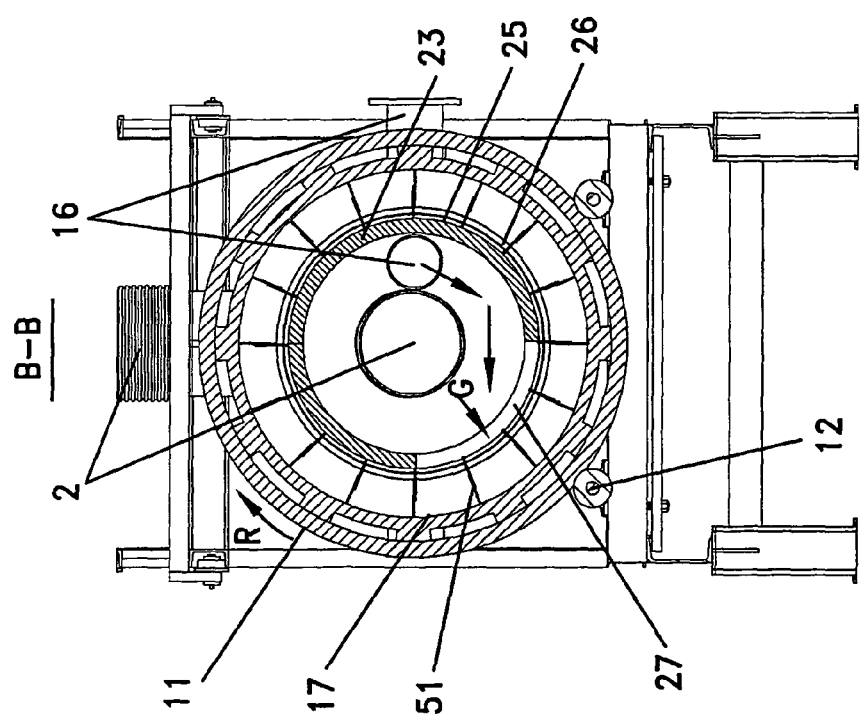
FIG. 6A is a cross sectional view of a flow director unit cut along plane B-B of FIG. 5A, showing the directed flow of heat carrier gases therethrough.

At the discharge end of inner drum 18, as shown in FIG. 6B, inwardly protruding from its inner surface are a plurality of dispensing elements 24, for raising the solid residue pieces 52 that remain at the completion of the pyrolytic process, e.g. char, so that the latter may be dispensed into exit tube 6 and then discharged to bin 7 (FIGS. 3 and 5A). Each dispensing element 24 may be planar as shown, or alternatively, may be curved, being suitably configured so that the solid residue piece 52 is released therefrom at a predetermined angular distance from the inner drum bottom at which solid residue piece 52 will fall into exit tube 6, by which it is gravitationally delivered to bin 7 (FIG. 3).

When dispensing element 24 is planar, it extends obliquely from inner drum 18 such that the proximal end thereof attached to the inner drum surface coincides with radius 58 of inner drum 18 and the distal end thereof is offset from the inner drum radius, defining an angle of up to approximately 30 degrees with respect to radius 58 in the direction of rotation R. At this angle, a solid residue piece 52 will be supported by both the exterior facing side of a dispensing element 24 and the inner drum surface while being rotated an angular displacement of approximately 140 degrees until sliding from the dispensing element into exit tube 6. Each dispensing element 24 is sufficiently long to guide solid residue piece 52 into exit tube 6. If a solid residue piece 52 is initially in contact with the interior facing side of a dispensing element 24, the rotation of inner drum 18 will cause another dispensing element 24 to approach and support the piece 52.

Figure 11B:
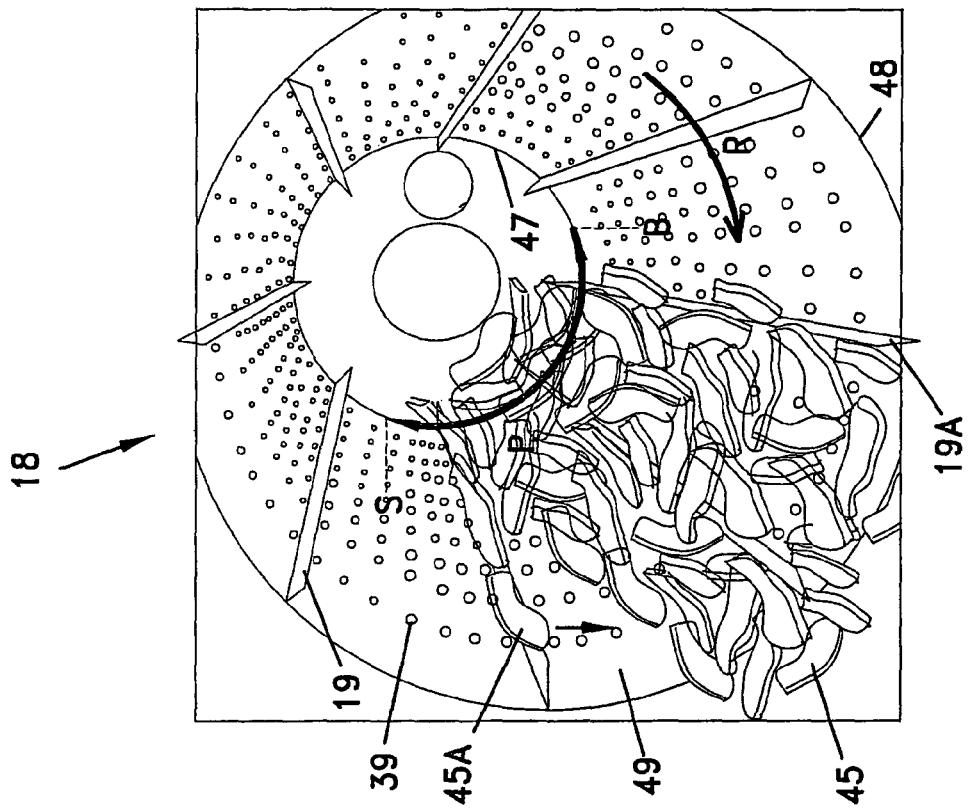
FIGS. 11A-B are a longitudinal, perspective view of the inner drum from within, showing the advancement of feedstock pieces from the inlet end to the discharge end of the inner drum.
Figure 11A:
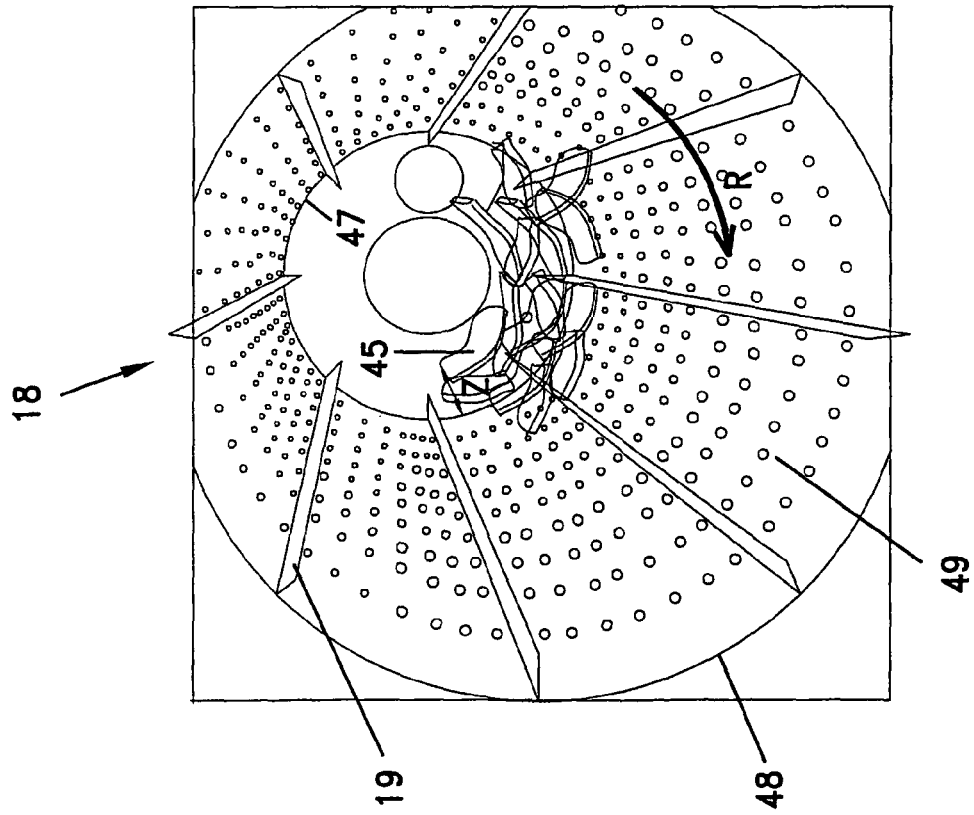

As shown in FIGS. 5A and 11A-B, the inner surface of inner drum 18 may be provided with a plurality of circumferentially spaced and longitudinally extending partitions 19, to further increase the angular displacement of the feedstock pieces while being upwardly rotated and the intensity of heat transfer from the heat carrier gases to the feedstock pieces.

Each partition longitudinally extends between the inlet end 47 to the discharge end 48 of the inner surface of inner drum 18 and may radially extend from the inner drum surface towards the interior. The feedstock pieces 45, after being discharged from feed tube 2 (FIG. 3), are released into the interior of inner drum 18 and fall onto the inner drum surface while being first localized to a region in the vicinity of inlet end 47, as shown in FIG. 11A. Consequently, a limited number of feedstock pieces are confined within a compartment 49 defined by two adjacent partitions 19 during rotation of inner drum 18 in direction R.

Referring now to FIG. 11B, the feedstock pieces 45 are retained in a compartment 49 throughout a predetermined angular displacement during rotation of inner drum 18 in direction R. When the feedstock pieces are being rotated upwardly, a partition, e.g. partition 19A, supports a plurality of feedstock pieces from below and other feedstock pieces are supported by those pieces being supported by the partition. At a predetermined angular displacement, depending on the partition height, rotational speed of inner drum 18, concentration of feedstock pieces 45 in a compartment, inclination of the inner drum, and coefficient of friction of the feedstock pieces, the feedstock pieces, e.g. pieces 45A, fall from a compartment to the inner drum bottom. The feedstock pieces are therefore able to be upwardly rotated at a significantly greater angular displacement than those introduced to an inner drum provided without partitions.

Since inner drum 18 is downwardly inclined, the feedstock pieces are displaced towards the discharge end after being upwardly rotated from a first inner drum bottom region. The feedstock pieces fall, upon conclusion of their angular displacement, to a second inner drum bottom region closer to the discharge end than the first inner drum bottom region.

The feedstock pieces during their advancement from inlet end 47 to discharge end 48 of inner drum 18 are normally in contact with only a specific circumferential portion P of the inner drum surface, which spans from approximately bottom B of the inner drum surface to region S at which the feedstock pieces separate from the inner drum surface, an angular span which may be approximately 100 degrees.

As described hereinabove, the heat transfer intensity to the feedstock pieces introduced to the reactor is improved with respect to prior art reactors by virtue of the passage of heat carrier gases to the interior of inner drum 18 through apertures 39. In order to optimize the utilization of the heat carrier gases, a flow director unit is employed in one embodiment of the invention to direct the heat carrier gases to a limited circumferential portion P. Furthermore, the pressure of the heat carrier gases within the clearance between the outer and inner drums, due to the pressure differential with respect to the inner drum interior, may be selected to ensure that the high pressure of the heat carrier gases will be noticeable, prior to being dissipated, only within a predetermined radial zone Z (FIG. 11A) from the inner surface of inner drum 18. While heat is transferred in prior art reactors to feedstock pieces only by conduction from the inner drum surface, intensive heat transfer will be carried out within radial zone Z of the reactor of the present invention. Thus surfaces of feedstock pieces not in contact with the inner drum surface, as well as adjacent layers of feedstock pieces located with radial zone Z of circumferential portion P will also be intensively heated.

The intensively heated feedstock pieces following their downward movement within the inner drum interior will heat, and be mixed with, other feedstock pieces. The feedstock pieces undergoing pyrolysis consequently achieve a substantially uniform temperature, leading to a substantially uniform rate of pyrolysis.

The structure of flow director unit 3 will be appreciated by referring to FIGS. 5-8.

As shown in FIGS. 5A and 7C-D, flow director unit 3 has a cylindrical wall 23 and a planar wall 29 at the inlet end thereof that is substantially perpendicular to the longitudinal axis of wall 23. Two apertures are bored in planar wall 29, a relatively large aperture 37 through which the feedstock piece feed tube passes into the interior of the inner drum and a relatively small aperture 38 through which the heat carrier gas tube passes.

As shown in FIGS. 5C and 7A-B, flow director unit 3 also has a planar wall 31 at the discharge end thereof, to block the passage of the heat carrier gases G into the interior of inner drum 18. Wall 31 is formed with a sealed aperture, the wall of which is supported on feed tube 2, which in turn is supported by one or more external support members. Feed tube 2 may also support an intermediate wall 30 of flow director unit 3, which is interposed between walls 29 and 31.

Figure 8:
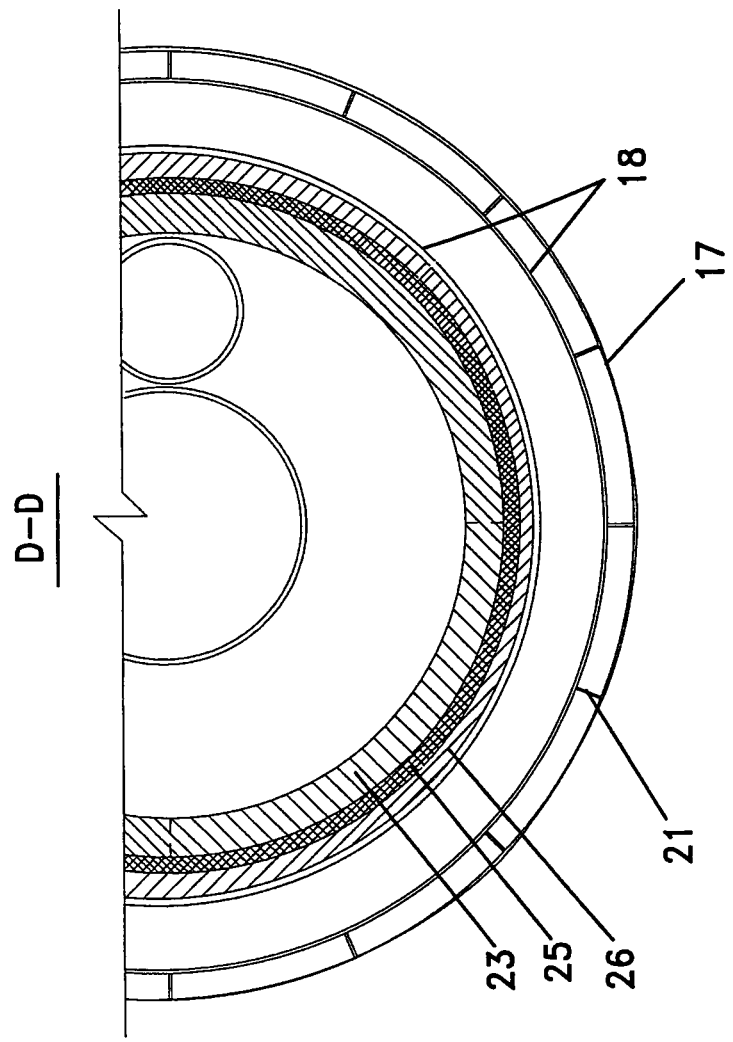
FIG. 8 is a cross sectional view of a flow director unit cut along plane D-D of FIG. 7B.

With reference to FIGS. 7B and 8, stationary flow director unit 3 is mounted within an opening internal to a supporting cylinder 26, which is connected, e.g. by welding, to rotatable end plate 36 of inner drum 17 and rotatable end plate 10 of outer drum 17. Sealing means interfacing between flow director unit 3 and cylinder 26 prevents the egress of heat carrier gases G. Packing material 25 wrapped around cylindrical wall 23 of flow director unit 3 is pressed by stuff-axle box 28 which encloses flow director unit 3. One or more stopper plates 32 vertically extending from cylindrical wall 23 limit the horizontal displacement of packing material 25.

Figure 9:
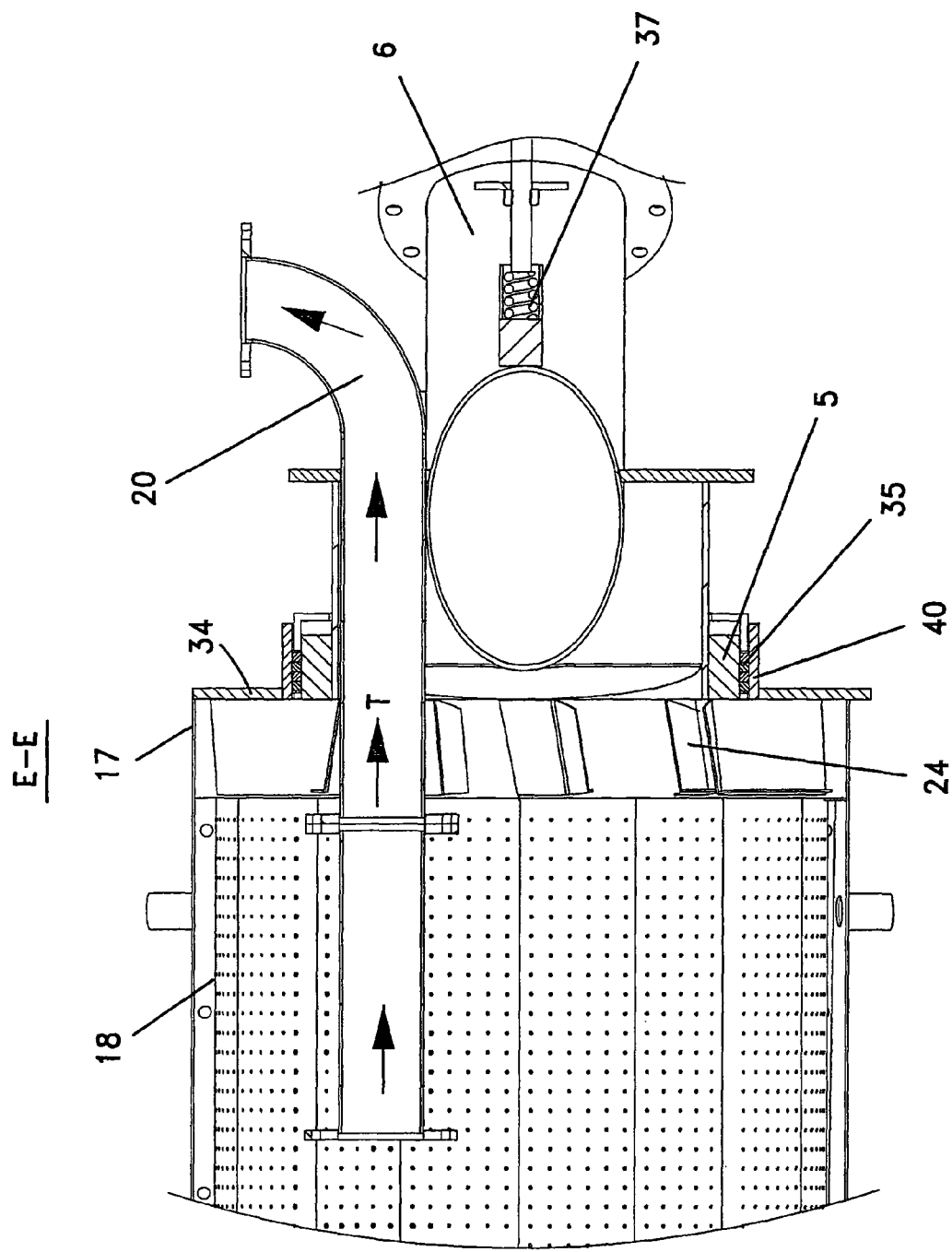
FIG. 9 is a partial cut-off view of the inner drum and a cross sectional view cut along plane E-E of FIG. 5A, showing the discharge of product gases through the exit pipe.

As shown in FIG. 9, packing material 35 wrapped around the cylindrical wall of stationary output port 5 interfaces with rotatable cylinder 40, which is connected to end plate 34 of outer drum 17 at the discharge end thereof, to prevent the egress of product gases T normally discharged from exit pipe 20.

With reference to FIGS. 5C, 6A, and 7B-D, cylindrical wall 23 of flow director unit 3, at one circumferential region thereof, is formed with one or more openings 27 between walls 30 and 31. The total angular distance of the openings 27 and their relative location along tubular wall 23 correspond to those of circumferential portion P (FIG. 11B), in which zone of the inner drum interior the feedstock pieces undergoing pyrolysis are confined as they advance from the inlet end to the discharge end. Tube 16 extends to intermediate wall 30, causing heat carrier gases G to flow through the interspace between walls 30 and 31 and then through an opening 27. Since openings 27 are located in the gap between end plate 10 of outer drum 17 and end plate 36 of inner drum 18 (FIG. 5A), heat carrier gases G exiting an opening 27 flow to the circumferential wall of outer drum 17 while their flow in one longitudinal direction is restricted by end plate 10.

Openings 27 are in communication with the annular clearance 44 between outer drum 17 and inner drum 18. Heat carrier gases G are driven longitudinally along clearance 44 due to the pressure differential between the pressure of the heat carrier gases and the pressure of the inner drum interior, whereupon gases G flow through the plurality of apertures 39 formed in inner drum 18 into the inner drum interior so as to selectively transfer heat to the feedstock pieces located in circumferential portion P (FIG. 11B) of the inner drum interior.

With reference to FIGS. 6A and 7B, the flow of heat carrier gases G within clearance 44 is restricted to a circumferential zone corresponding to the angular distance of openings 27 by means of a plurality of circumferentially spaced and radially extending barrier members 51 that are connected to the inner surface of outer drum 17 and may also be connected to inner drum 18, e.g. to end plate 36. Each barrier member 51 may comprise two elements: a metallic element J, e.g. made of steel, protruding from the inner surface of outer drum 17, and a flexible element K radially extending from, and attached to, element K. Flexible element K may be a panel of heat insulation material that is resistant to the high temperature of the heat carrier gases. By employing a flexible element K, the radial length of barrier member 51 may be slightly greater than the gap from the inner surface of outer drum 17 to cylindrical wall 23 of flow director unit 3. Accordingly, the distal end of element K will flex upon contacting cylindrical wall 23, so that during the rotation of outer drum 17, e.g. in direction R, the flexible element K of each barrier member 51 will sealingly and rotatably contact wall 23 of flow director unit 3. Due to the sealing contact between the barrier members 51 and cylindrical wall 23, additional circumferential flow of heat carrier gases G passing through opening 27 is essentially prevented by the two adjacent barrier members 51. Gases G are therefore forced to flow longitudinally through clearance 44 and within the circumferential zone corresponding to the angular distance of openings 27.

Alternatively, each barrier member 51 may comprise a single element radially extending from the outer drum surface to be essentially in contact with, and slightly separated from, cylindrical wall 23 of flow director unit 3.

Figure 10A:
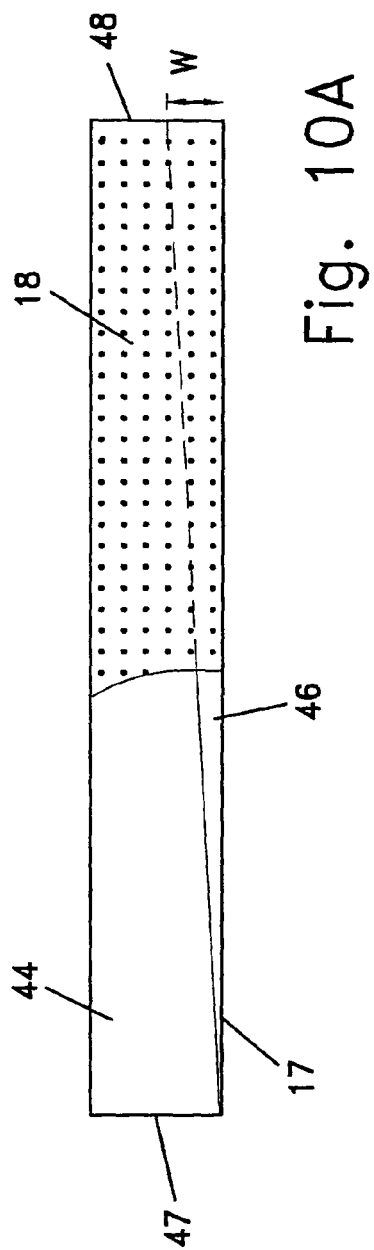
FIG. 10A is a partially fragmented longitudinal strip of the inner drum circumferential wall shown from the interior of the inner drum, showing a baffle plate for inducing a change in flow rate of the heat carrier gases.
Figure 10B:
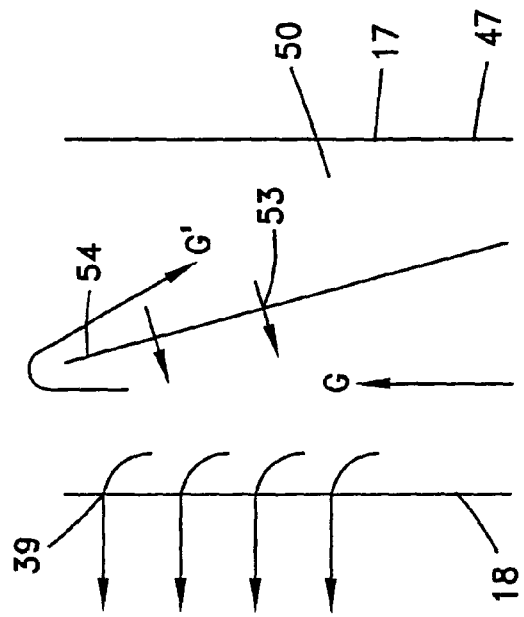
FIG. 10B is a schematic illustration of the change in flow of the heat carrier gases that is induced by the baffle plate of FIG. 10A.

In another embodiment of the invention illustrated in FIGS. 10A and 10B, the longitudinal flow rate of the heat carrier gases through annular clearance 44 is caused to change, to provide a required level of heat influx of the heat carrier gases into the inner drum interior, in a direction which is generally perpendicular to the longitudinal flow within clearance 44, for pyrolysis of relatively large feedstock pieces throughout the annular clearance. If the width of the zone of clearance 44 through which the heat carrier gases flow were uniform from the inlet end to the discharge end, the heat influx at the discharge end would be greater than at the inlet end while the heat influx should preferably be greater at the inlet end.

A baffle plate 46 for controlling the longitudinal flow of heat carrier gases G may be attached to the inner surface of outer drum 17 and occupy a selected portion of clearance 44 while extending towards inner drum 18. The unattached edge of baffle plate 46 may be at an angle with respect to the edge thereof attached to outer drum 17, to induce a correspondingly reduced flow rate of heat carrier gases at inlet end 47 than at discharge end 48. A baffle plate 46 may angularly extend between two adjacent barrier members 51 (FIG. 7B) from inlet end 47 to discharge end 48. Since the flow rate and therefore the dynamic pressure of heat carrier gases in the vicinity of inlet end 47 is relatively low, the static pressure of the heat carrier gases which is influential in driving the latter into the inner drum interior via the apertures, due to the pressure differential between clearance 44 and the inner drum interior, is relatively high. Thus feedstock pieces at inlet end 47, which are of a relatively low temperature and require a proportionally greater level of heat influx to be pyrolyzed than feedstock pieces in the vicinity of discharge end 48, are subjected to a greater static pressure of heat carrier gases G than the feedstock pieces in the vicinity of discharge end 48. Conversely, width W is greater in a downstream region, i.e. in a direction towards discharge end 48. Consequently, the flow rate and therefore the dynamic pressure of heat carrier gases G in a downstream region is increased, resulting in a relatively reduced static pressure at a downstream region which is nevertheless sufficient to pyrolyze the feedstock pieces thereat. Thus the heat influx into inner drum 18 at each longitudinal region thereof is sufficiently high for pyrolyzing relatively large feedstock pieces.

As shown in FIG. 10B, baffle plate 46 may be formed with a plurality of apertures 53 which are adapted to induce a further change in the flow rate of the heat carrier gases. If so desired, a portion G' of heat carrier gases G may be urged, at the discharge end 54 of baffle plate 46, to flow through a pyramidal region 50 formed between the baffle plate and the inner surface of outer drum 17 and towards inlet side 47 in order to control the heat influx into inner drum 18. The heat carrier gas portion G' flowing towards inlet side 47 may flow through apertures 53 in baffle plate 46 and recirculate around discharge end 54 of baffle plate 46 or be introduced into the inner drum interior via apertures 39. The gap between baffle plate 46 and barrier member 51 (FIG. 7B) may be of a variable width W (FIG. 10A).

Alternatively, the longitudinal flow of the heat carrier gases through the annular clearance may be caused to change by varying the aperture density, i.e. the number of apertures per unit area, at a given longitudinal region, or if so desired, the size of the apertures at a given longitudinal region.

As can be appreciated from the above description, the reactor of the present invention achieves a good pyrolytic performance even when relatively large sized feedstock pieces are fed thereto. The types of feedstock pieces that can be fed to the reactor include, but are not limited to, tire pieces, coal pieces, oil shale, and municipal waste products.

The following example provides some operating conditions for a reactor to which tire pieces are fed.

EXAMPLE

The pyrolytic reactor comprised an inner drum with a diameter of 1 m, and a coaxial outer drum defining a clearance of 30 mm. The circumferential wall of the inner drum was perforated with 5 mm apertures such that the uniform distance between adjacent apertures was 5 mm. The reactor was inclined at an angle of 1 degree downwards. The reactor was rotated at a constant angular velocity of 0.25 rpm. Tire pieces with a size ranging from 200-300 mm and having metal cords protruding from the rubber base were continuously fed at a rate of 100 kg/hr.

The heat carrier gases, which were directed to the clearance and then into the inner drum interior via the apertures, were the product of gasification of the solid, pyrolyzed carbonized residue. In addition to the solid residue, steam and air were introduced to a gas generator. The gas generator was initially heated by the combustion of a standard mixture of propane and butane from a cylinder, achieving a temperature within the gas generator of 1000° C. As a result of the reactions within the gas generator, the heat carrier gases that were generated consisted mainly of carbon monoxide, hydrogen sulfide, and nitrogen. The mixture of heat carrier gases was cooled down to 650° C. by means of heat exchangers and introduced to the reactor at a flow rate of 750 m$^3$/hr and a pressure of 110 mmH$_2$O. The pressure of the inner drum interior was 20 mmH$_2$O At these conditions, the measured temperature of the solid residue pieces discharged from the reactor was 490° C. The feedstock pieces advanced within the inner drum by means of a plurality of circumferentially spaced partitions. The product gases that resulted from the pyrolytic process included hydrocarbons $C_1$-$C_4$ and hydrogen sulfide. A liquid product was separated from the product gases and was condensed. The liquid product had a specific gravity of 0.8929, a viscosity at 40° C. of 2.401, a sulfur content of 0.94%, and an ash content of 0.008%. The mixture of product vapor and gases and of the heat carrier gases was evacuated from the inner drum interior and was introduced to a dust cleaning, cooling, condensation, and separation system by means of an exhauster. The size of the solid residue pieces was no greater than 25 mm.

From 100 kg of tire pieces that were fed into the reactor, 11.7 kg of product gases, 43.5 kg of liquid products, and 44.8 kg of solid residue pieces (containing 14.7 kg of steel) were produced. The non-recycled portion of the product gases, which was purified from hydrogen sulfide by means of activated carbon, was used to generate electrical power by means of a diesel electro-generator.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A pyrolytic reactor, comprising:
   a) a rotatable inner drum having a perforated circumferential wall formed with a plurality of apertures;
   b) a rotatable outer drum surrounding, and connected to, said inner drum and defining a clearance therebetween;
   c) a feeding device for feeding a plurality of feedstock pieces to the interior of said inner drum at an inlet end thereof;
   d) a stationary inlet port through which heat carrier gases flow and are directed to said clearance, for introduction of said heat carrier gases via said plurality of apertures to a selected region of the inner drum interior to cause pyrolysis of said fed feedstock pieces by means of a cross flow of said heat carrier gases and resulting intimate contact between said heat carrier gases and said feedstock pieces;
   e) means for controlling the longitudinal flow rate of said heat carrier gases through said clearance to ensure an increased heat influx at said inlet end of said inner drum than at a discharge end of said inner drum;
   f) conveying means for transporting a plurality of solid residue pieces produced from a pyrolytic process; and
   g) a stationary outlet port through which product vapors and gases, heat depleted heat carrier gases, and the plurality of solid residue pieces are discharged.

2. The reactor according to claim 1, wherein the inlet port comprises a flow director unit configured with:
   a) a circumferential wall formed with one or more openings in communication with the clearance;
   b) a planar wall at the inlet end of said flow director unit circumferential wall;
   c) a first aperture bored in said inlet end wall through which a feedstock piece feed tube passes into the interior of the inner drum;
   d) a second aperture bored in said inlet end wall through which a heat carrier gas tube passes; and
   a planar wall at the discharge end of said flow director unit circumferential wall through which said feed tube passes into the interior of the inner drum, and for directing the heat carrier gases to said one or more openings in communication with the clearance and for thereby causing longitudinal flow of the heat carrier gases through the clearance.

3. The reactor according to claim 1, wherein the outer drum and the inner drum are rotatable about a common axis by drive means.

4. The reactor according to claim 2, wherein the longitudinal flow of the heat carrier gases is limited through a circumferential zone of the clearance by means of a plurality of circumferentially spaced and radially extending barrier members that protrude from the inner surface of the outer drum.

5. The reactor according to claim 4, wherein the outer drum slightly longitudinally protrudes from the inner drum and each of the plurality of barrier members radially extends from the inner surface of the outer drum to substantially contact the flow director unit circumferential wall.

6. The reactor according to claim 5, wherein each of the plurality of barrier members comprises a proximal rigid element and a distal flexible element for sealingly and rotatably contacting the flow director unit circumferential wall.

7. The reactor according to claim 6, wherein the radial length of each barrier member is slightly greater than the gap from the inner surface of outer drum to the flow director unit circumferential wall.

8. The reactor according to claim 6, wherein the distal element is a panel of heat insulation material that is resistant to the temperature of the heat carrier gases.

9. The reactor according to claim 4, wherein the heat carrier gases are directed to a circumferential portion of the inner drum interior having an angular distance substantially equal to that of the one or more openings formed in the flow director unit circumferential wall.

10. The reactor according to claim 1, wherein the inner drum is inclined such that the inlet end thereof is disposed above the discharge end thereof, the feedstock pieces being conveyed from a first inner drum bottom region to a second inner drum bottom region closer to the discharge end than said first inner drum bottom region following upward rotation of the inner drum and a subsequent descent of the feedstock pieces upon conclusion of their angular displacement.

11. The reactor according to claim 10, wherein a plurality of circumferentially spaced partitions radially extend from the inner drum surface and longitudinally extend between the inlet end to the discharge end of the inner drum, the feedstock pieces being retained in a compartment defined by two adjacent partitions and the inner drum surface throughout a predetermined angular displacement during rotation of the inner drum.

12. The reactor according to claim 11, wherein a partition supports a plurality of feedstock pieces from below when they are being upwardly rotated.

13. The reactor according to claim 1, wherein a plurality of equally and circumferentially spaced dispensing elements inwardly protrude from the inner surface of the inner drum at the discharge end thereof, for sequentially raising the solid residue pieces and dispensing the same into an exit tube during rotation of the inner drum.

14. The reactor according to claim 13, wherein the solid residue pieces are gravitationally dispensed via the exit tube into a transportable bin.

15. The reactor according to claim 13, wherein each of the dispensing elements is planar and has a distal end that is offset from an inner drum radius in the direction of rotation, a solid residue piece being supported by both an exterior facing side of a corresponding dispensing element and the inner drum surface while being angularly displaced until sliding from the dispensing element into the exit tube.

16. The reactor according to claim 1, wherein the outer drum and the inner drum are connected together by a plurality of circumferentially spaced plates that radially extend therebetween.

17. The reactor according to claim 4, wherein the flow rate controlling means is a baffle plate attached to the inner surface of the outer drum and occupying a selected portion of the clearance.

18. The reactor according to claim 17, wherein the baffle plate angularly extends between two adjacent barrier members from the inlet end to the discharge end, inducing a correspondingly slower flow rate of heat carrier gases at the inlet side than at the discharge side.

19. The reactor according to claim 1, wherein the longitudinal flow rate of the heat carrier gases is controlled by means of a selected density of apertures in the inner drum circumferential wall.

20. The reactor according to claim 13, further comprising a knife valve for occluding the exit tube prior to transporting the bin to a location whereat the solid residue pieces are discharged therefrom.

21. The reactor according to claim 1, wherein the pressure of the heat carrier gases within the clearance is selected to be sufficiently high to pyrolyze the feedstock pieces only within a predetermined radial zone from the inner surface of inner drum.

22. The reactor according to claim 1, wherein the heat carrier gases are not reactable with the product gases.

23. The reactor according to claim 1, wherein the size ratio of a removed solid residue piece to a fed feedstock piece is less than 10% for the size of a fed feedstock piece on the order of 200 mm or greater.

24. The reactor according to claim 1, further comprising isolating means for isolating the product vapors and gases from the feeding device, thereby preventing environmental pollution upon charging the feeding system.

25. The reactor according to claim 23, wherein the isolating means comprises means for purging the interior of a feeding device drum from the product gases by means of a gas not reactable with the feedstock pieces and which is deliverable to the inner drum.

26. The reactor according to claim 23, wherein the isolating means comprises a knife valve operatively connected to a feed tube through which the feedstock pieces are delivered from the feeding device.

* * * * *